United States Patent [19]

Fritz

[11] Patent Number: 4,487,102

[45] Date of Patent: Dec. 11, 1984

[54] STOWAGE PACK FOR CONTROLLED BOMB/MINE LANYARD PAYOUT

[75] Inventor: Alfred G. Fritz, Baltimore, Md.

[73] Assignee: The United States of America as represented by the Secretary of the Navy, Washington, D.C.

[21] Appl. No.: 510,040

[22] Filed: Jul. 1, 1983

[51] Int. Cl.³ .......................... F41F 5/02; B64D 1/04
[52] U.S. Cl. ...................................... 89/1.55; 244/149
[58] Field of Search .......................... 89/1.5 D, 1.5 R; 244/149; 258/1.2

[56] References Cited

U.S. PATENT DOCUMENTS

| | | | |
|---|---|---|---|
| 3,326,083 | 6/1967 | Johnson | 89/1.5 D |
| 3,366,008 | 1/1968 | Grandy | 89/1.5 D |
| 3,450,377 | 6/1969 | Mitchell | 244/149 |
| 3,476,012 | 11/1969 | Jackson | 89/1.5 D |
| 3,492,911 | 2/1970 | Adams | 89/1.5 D |
| 3,575,084 | 4/1971 | Glendenning et al. | 89/1.5 D |
| 4,083,519 | 4/1978 | Matsuo | 244/149 |
| 4,167,887 | 9/1979 | Magro | 89/1.5 D |
| 4,299,157 | 11/1981 | Burns et al. | 89/1.5 D |

Primary Examiner—David H. Brown
Attorney, Agent, or Firm—Robert F. Beers; Kenneth E. Walden

[57] ABSTRACT

A stowage pack containing a lanyard is disclosed for use on military aircraft to provide for arming and safe release of bombs and mines (stores) and for opening of stabilizing and drag fins.

The stowage pack is connected with a shackle on board the aircraft and packages a non-magnetic lanyard which is connected at its opposite ends, respective, to the pack and to the store. Once the store is released from the shackle and falls away from the aircraft, the lanyard pulls pins to arm the store or open fins or a parachute compartment. After the store falls farther, it breaks the lanyard at a weak section near the pack and they fall away together, leaving only the pack connected with the aircraft shackle.

6 Claims, 5 Drawing Figures

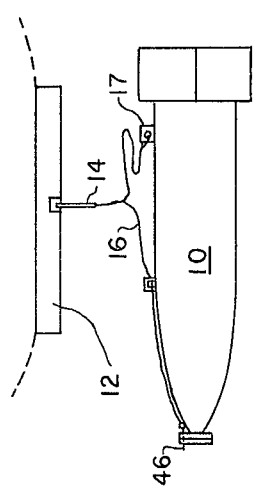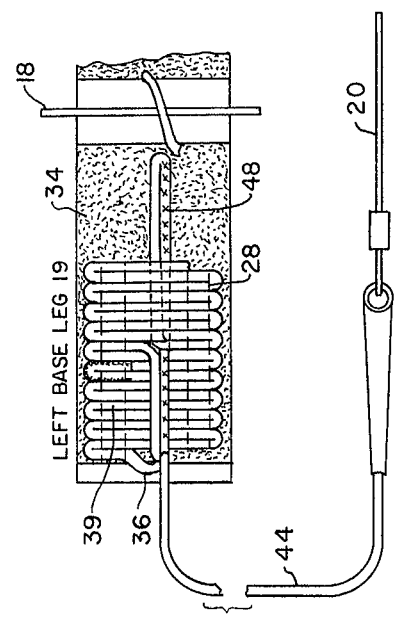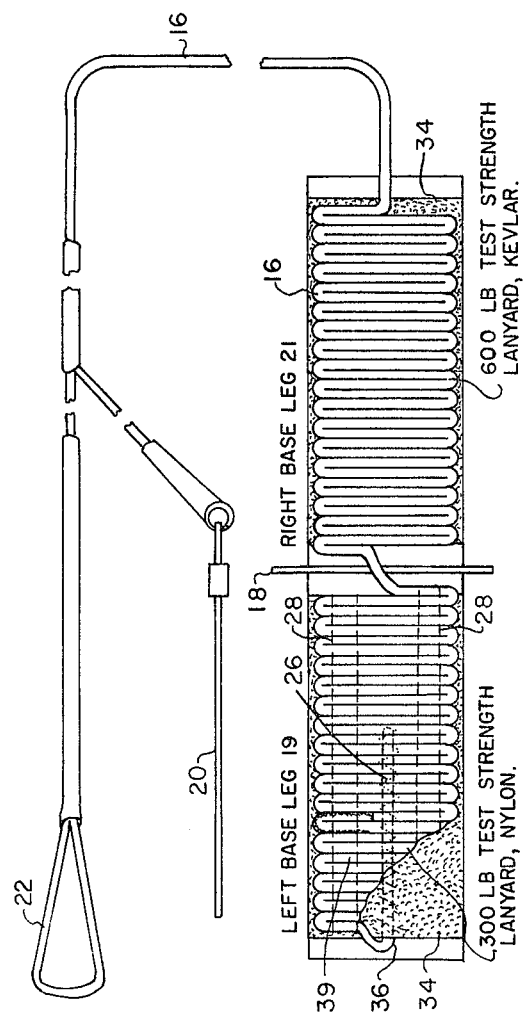

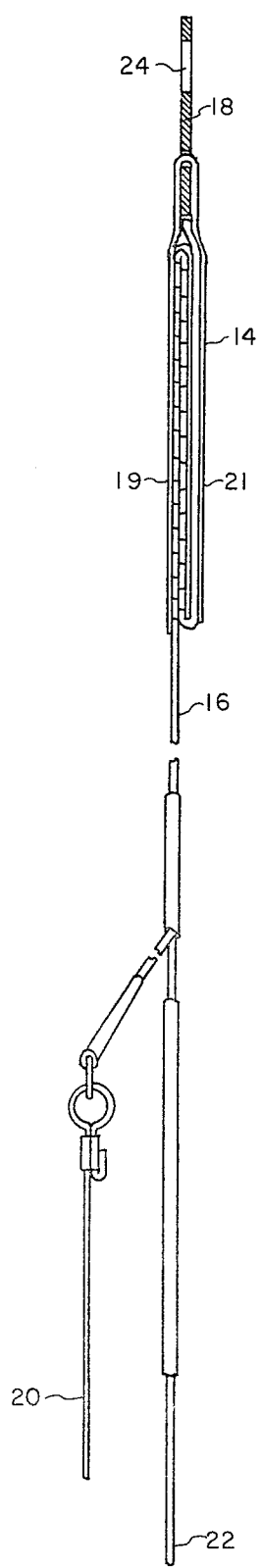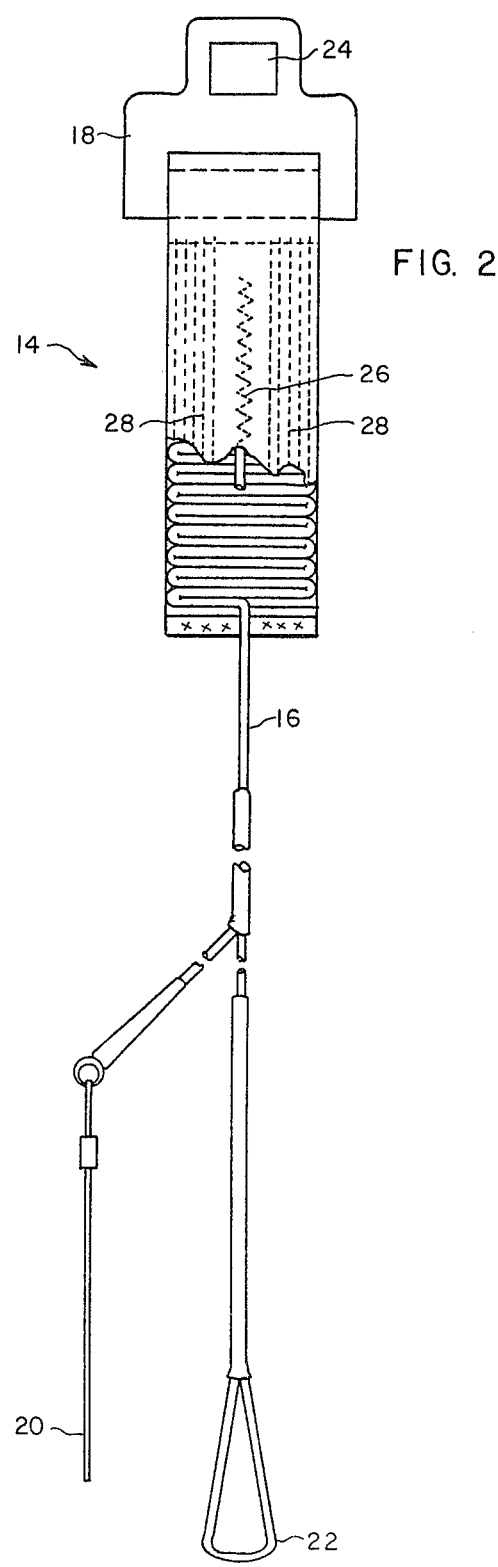

STOWAGE PACK FOR CONTROLLED
BOMB/MINE LANYARD PAYOUT

BACKGROUND OF THE INVENTION

Stores, such as bombs and mines, carried aboard or out board of aircraft have fuzes or explosive initiators which are maintained in a normally safe condition until the store is actually released from the aircraft and has fallen some predetermined distance away. This arming or other function performed on the store is often accomplished by an arming wire connected between the aircraft frame and the fuze or detonator. The wire is allowed to pay out with the falling store to some predetermined length where, upon becoming taut, a pin is extracted from the fuze or detonator to allow arming. The wire is subsequently broken at a weak link provided on the wire near the aircraft by the weight of the falling store and falls away with it. Although the cable and release mechanisms are designed with extreme simplicity, malfunctions are often encountered. The weak link may vary in breaking load, or the wire itself may break at some other location along its length, possibly near the store. In this event a length of wire (ranging up to around 20 feet) is left connected with the aircraft. It flails around in the air to interfere with the dropping of additional stores, or it may damage the aircraft itself. Methods have been proposed to overcome such problems.

One method currently used is known as a belly band. It consists of a strip of webbing with sewn in channels or pockets into which are fitted folded lengths of wire rope provided with a weak link by which it is connected to the shackle. This device is installed or wrapped completely about the central area of a bomb, hence, the term "belly band".

In theory the wire rope deploys evenly from the pockets and the weak link breaks under load of the falling store when the rope is fully extended to extract an arming pin or open fins. In actuality, the weak link has been found unreliable, often breaking far below or far above its designed figures. Furthermore, the cross-sectional size of the wire rope presents a large enough surface to the high velocity air stream to create sufficient drag to deploy several folds of the wire rope at once. This allows the rope to form in a long U-shape between the falling store and the aircraft shackle. This condition results in fin deployment (when fins are used) dangerously close to the aircraft and collision with other stores is likely. A wire rope, even if it breaks properly, cannot be used with underwater mines because its movement about by water currents could simulate a target to a sensor and lead to untimely detonation.

U.S. Pat. Nos. 3,366,008 and 4,167,887 are examples of arrangements for deploying lanyards, but which may allow substantial lengths to be prematurely released by the air stream.

SUMMARY OF THE INVENTION

The invention relates to a stowage pack which houses a non-metallic lanyard (Nylon and Kevlar) folded therein for allowing it to pay out under controlled tension when one end is connected with a falling store.

The stowage pack body is adapted to be attached to the aircraft shackle. The stowage pack body retains a length of non-metallic lanyard folded therein according to a predetermined S-shaped pattern. One end of the lanyard is fixedly secured to the stowage pack body, and its other end extends from the body to define a free end adapted to be connected with the arming or other release mechanisms on the store. When the store is released from its shackle, the lanyard is caused to be pulled out of the stowage pack under controlled tension which prevents excessive lengths of the lanyard to deploy prematurely. Upon the store falling farther away from the aircraft, its weight breaks the lanyard at a weak section near the stowage pack. In this manner, substantially only the stowage pack body remains attached to the shackle as the main length of the lanyard falls away with the store.

It is, therefore, an object of the invention to provide an improved lanyard arrangement for use with aircraft.

It is another object of the invention to provide an improved lanyard payout deployment arrangement for use on an aircraft between the store and its shackle for arming the store or opening fins without likelihood of entanglement or potential damage to the assembly.

BRIEF DESCRIPTION OF THE DRAWINGS

FIG. 1 is a side view of a store (bomb or mine) in free fall immediately after release from the aircraft shackle with the actuating lanyard just coming into play.

FIG. 2 is a side view of the stowage pack, partly cut away, illustrating lanyard folds and stitching.

FIG. 3 is an edge view of the stowage pack illustrated in FIG. 2.

FIG. 4 is an inside view of the right and left base legs of the stowage pack spread apart for illustrating one embodiment of lanyard folds.

FIG. 5 is another view of the storage pack illustrating another embodiment of lanyard folds and attachment.

DETAILED DESCRIPTION OF THE INVENTION

Referring now to the drawings, there is illustrated in FIG. 1 a store (bomb or mine) 10 just after release from its shackle 12 located on the wing or in the bomb bay of an aircraft. A lanyard stowage pack 14 is illustrated connected with the shackle. As the store falls away from the aircraft, very light tension on lanyard 16 extracts pin 20 from the safe and arm device on the nose of the store to allow it to become armed after a few turns of a propeller located thereon. To the main lanyard is attached another pin for releasing finlike stabilizers and speed brakes on bombs dropped from low altitudes (not illustrated in FIG. 1).

As armed store 10 continues its descent, lanyard 16 is caused to be withdrawn under relative light tension or restraint from stowage pack 14 until it is completely fed out to its full length of about 17 feet. Tension on the lanyard merely progressively breaks stitching that holds the lanyard S-folds in position between the pack legs. After the lanyard's full length is deployed, the stabilization fin release pin is pulled after which pull is automatically transferred to lug 17 on the store to which the end of the lanyard is attached. The weight of the falling store then breaks the lanyard. The lanyard is made up of two lengths of non-metallic cord connected end to end. The first line which pays out is a fourteen-foot length of Kevlar lanyard connected at its outer end to pin 20 and to lug 17 on the store. This line is followed by a one and one half foot length of Nylon lanyard connected with it. The Kevlar line has a breaking strength of 600 pounds while the Nylon line 36 has a breaking strength of 300 pounds. Thus, the Nylon line defines a weak link in the lanyard, The Nylon cord is the last of the lanyard to pay out and its end is securely sewn into the pack leg.

In this manner, after the lanyard breaks, a length 14.5 to 16 feet long falls away with the store. Since both sections on the lanyard are non-magnetic they do not interfere with instrumentation inside the store, such as when the store is a mine. The aircraft base legs, and possibly a short length of the Nylon cord, is all that remains with the stowage pack after the store has fallen away. In this manner, the problems with a wire rope, previously referred to, are overcome.

A side view of the stowage pack is illustrated in FIG. 2. The stowage pack comprises a length of 2" wide Nylon webbing which is doubled on itself about a hanger 18 to form two base legs 19 and 21 which stow the lanyard lines therebetween. One end of line 36, the weak link length, is sewn directly into one of the base legs by stitching 26. The other end of lanyard 16 extends free of the pack to be connected with a pull pin 20 and a loop 22 which connects with a lug 17 on the store. Load on the lanyard substantially above an amount necessary to break the stitching between the base legs causes it to break at the weak link.

The lanyard is folded back on itself on the inner faces of the two base legs. The legs are brought together and sewn with longitudinal stitching as illustrated in FIG. 2. Hanger 18 includes an eye 24 which is adapted for releasible connection with shackle 12.

FIG. 3 is a side view of stowage pack 14 showing hanger 18 and lanyard 16 disposed between its opposed legs.

Stitching 26 holds the end of the weak link line secured to one of the base legs as illustrated in FIG. 2. Stitching 28 is provided through the base legs for temporarily holding lanyard 16 in folded position on respective base legs.

The manner in which the lanyard is provided on and secured to the base legs, herein arbitrarily designated right and left base legs, will be described with reference to FIG. 4. A short length 36 of Nylon "weak link" lanyard is laid directly over a portions of the left base leg 19. And permanently sewn thereto by stitching 26. Velcro hook pad material 34 is then laid over the webbing of both legs and sewn thereto. The remainder 39 of the Nylon lanyard is S-folded back and forth along the Velcro pad material 34 from adjacent the tip of base leg 19 to about half way up where it terminates in a splice with the Kelvar portion of the lanyard. The Kevlar lanyard continues in S-folds up the face of the pad and across to right base leg 21 and down it over the face of the Velcro pad. The lanyard extends from the end of base leg 21 as illustrated in FIG. 4, and a length 16 extends to where it splits for connection with pin 20 and loop 22, respectively.

The lanyard folds disposed over the face of base leg 19 are stitched thereto by four rows of stitching 28.

Base legs 19 and 21 are then brought together, thus sandwiching the lanyard's folds. Four more rows of stitching are made through both base legs. Thus, one exterior side of the finished stowage pack shows four rows of lanyard stitching while the opposite side (e.g., FIG. 2) shows 8 rows. In this manner as the lanyard is deployed from the stowage pack, first from the right base leg then from the left base leg, it is always breaking four rows of stitching thread. This creates a controlled pull-out force throughout lanyard deployment.

Starting with FIG. 1, after store 10 is released from shackle 12 and has dropped only a short distance, one length of lanyard 16 is caused to extract pin 46 from the safe-arm device. Upon the store falling farther away from the aircraft, the weight of the store pulling on the lanyard begins to break progressively the four rows of stitching holding it onto the pack base legs, first up right base leg 21 then across to and down left base leg 19. When the whole lanyard length is paid out, the weight of the falling store snaps the lanyard weak link near the stowage pack. The store falls away with an approximately 17-foot length of non-magnetic line, leaving only a short length of the Nylon weak link attached to leg 19 of the stowage pack. Even if the lanyard should break at some location other than at the weak length (e.g., near the store) it is light weight and its flailing around would not likely damage the aircraft.

A slightly different embodiment of the stow pack is illustrated in FIG. 5. A lanyard length 44 extends from the left base leg and terminates at a pin 20. This arrangement is used when pin 46 is disposed in the arm safing device in the nose of the store, and lanyard 16, which is considerably longer, is connected with mechanism adjacent the tail of the store for releasing stabilizing or drag fins.

The length of lanyard 44 is relatively short, just sufficient in length to reach from the stowage pack to the nose of the store. The inner end of lanyard 44 is connected with the folds disposed along left base leg 19, as illustrated in FIG. 5, and sewn to the webbing beneath by stitching 48. This stitching is sufficiently strong to anchor lanyard 44 for extracting pin 46 from the arm safing device. Thereafter, lanyard length 16 comes into play when it is drawn taut to pull a pin such as pin 20 from mechanism to release the stabilizing and break fins (not illustrated in FIG. 1). With this arrangement loop 22 is connected with lug 17 of the store to break the lanyard weak link after it has completely paid out.

There has been described improved stowage packs for deploying a lanyard under constant tension and pay out, and providing for controlled breakage of the lanyard line.

Obviously, many modifications can be made to the present disclosure without departing from the spirit of the invention. It is, therefore, understood that the invention is meant to be limited in coverage only by the scope of the claims annexed hereto.

What is claimed is:

1. A stowage pack adapted for operative attachment to an aircraft shackle and stow therein a lanyard, one end of which is connected with a store to pay out with the store upon its release from the aircraft shackle, comprising:

a length of flat fabric webbing adapted to be secured to an aircraft shackle;

said webbing including a pair of depending base legs having inner faces;

a lanyard having one end fixedly secured to one base leg end and S-folded up the inner face of that leg and down the inner face of the other leg and extending therefrom for operative connection with a store;

a portion of the lanyard adjacent its one fixed end having a lower tensile strength than the remainder of the lanyard for defining a weak link;

said base legs stitched together in facing relationship to secure the S-folded lanyard therebetween;

whereby, upon the store falling away, the lanyard attached to it is pulled from between the base legs by progressively breaking stitching, and, when the lanyard is fully paid out, it breaks at the weak link under the weight of the store.

2. The invention according to claim 1 wherein the lanyard is formed of a fibrous material.

3. The invention according to claim 1 wherein the inner faces of the base legs are covered with Velcro hook material adapted to cling with the fibrous material of the lanyard.

4. The invention according to claim 1 wherein additional stitching holds the base legs together even after all the lanyard s-folds are pulled free.

5. The invention according to claim 1 wherein a second lanyard is attached at one end to lanyard S-folds up the one base leg and its other end is operatively connected with the store for arming the store when it is drawn taut.

6. The invention according to claim 5 wherein the second lanyard is securely attached to the first lanyard to fall free with it after breakage of the weak link.

* * * * *